July 10, 1951     R. L. RHOTEHAMEL     2,560,129
FISHING FLOAT
Filed April 10, 1948
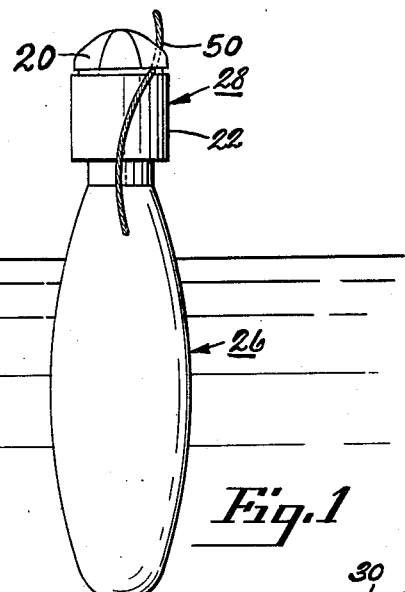
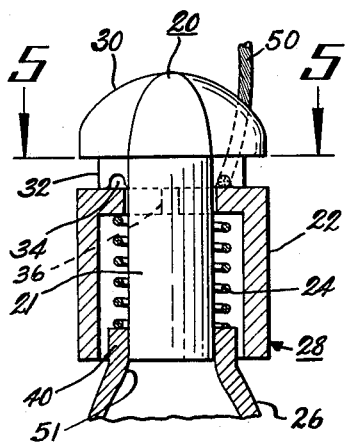
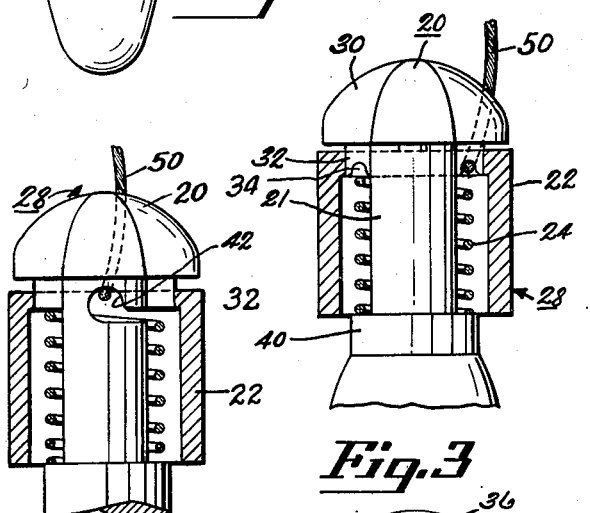
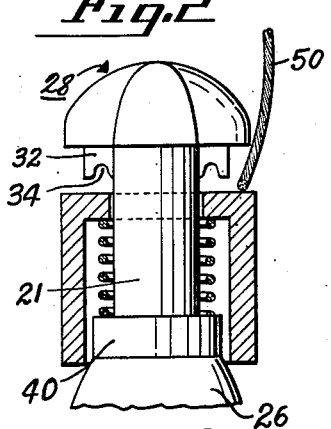
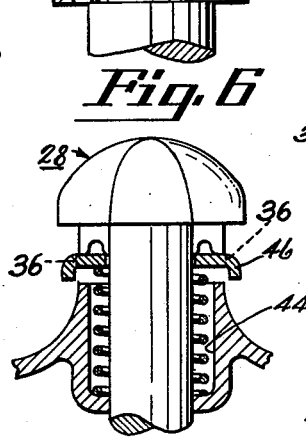
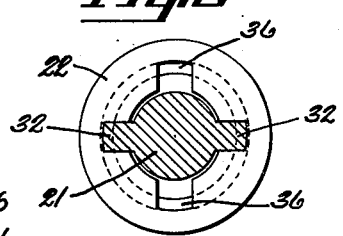
INVENTOR.
RALPH L. RHOTEHAMEL
BY John T. Marvin
his Attorney Patented July 10, 1951

2,560,129

UNITED STATES PATENT OFFICE 2,560,129

FISHING FLOAT

Ralph L. Rhotehamel, Dayton, Ohio

Application April 10, 1948, Serial No. 20,289

5 Claims. (Cl. 43—44.89)

This invention relates to fishing floats and is particularly concerned with a float which is adjustable and slidable on a line.

It is therefore the main purpose of this invention to provide a fishing float with a locking device which is adjustable to a plurality of positions that will permit the line to slide freely through the float or to be locked thereto.

Another object of the invention is to provide a fishing float having a line holder in connection therewith which comprises a locking device adjustable to two main positions, whereby the line may slide through the locking device or be held immovable relative thereto. In carrying out the above objects it is a further object to provide a spring pressed locking device which may cooperate with a portion of the float and which includes an upstanding plug having an upper stop or cap thereon; the plug is provided with a notch through which the line may be threaded, which notch cooperates with a spring actuated locking ferrule for holding the line immovable with respect to the float in one position thereof and which when turned a predetermined angle will be locked in another position with respect to the plug and the notch so that the line may slide freely through the notch. The ferrule may be pressed downwardly still further against spring pressure to permit complete removal or insertion of the line within the notch.

Further objects and advantages of the present invention will be apparent from the following description, reference being had to the accompanying drawings, wherein preferred embodiments of the present invention are clearly shown.

In the drawing:

Fig. 1 is a view showing one type of fishing float incorporating the novel locking device described herein.

Fig. 2 is an enlarged view in section of one type of locking device wherein the device is in a position which permits free sliding movement of the line thereto.

Fig. 3 is an enlarged view in section of a locking device with the device in position to hold the line immovable in connection with the float.

Fig. 4 is an enlarged view in section of the locking device with the ferrule portion pressed downwardly whereby the line may be removed or inserted.

Fig. 5 is a section taken on line 5—5 of Fig. 2.

Fig. 6 is a view in section of another form of plug to be used in connection with the locking device.

Fig. 7 is still another embodiment of the locking device somewhat similar to that shown in Fig. 2.

I am aware of numerous designs of fishing and/or casting floats which include a locking device for gripping the line, these floats for the most part are complicated in design and expensive to manufacture and in many cases are delicate in nature so that the mechanisms used for locking the line in connection with the float are easily thrown out of adjustment. Furthermore, the majority of floats utilize a portion of the float as an active part of the locking device thereby limiting the design of float to be used therewith.

The present invention is directed to a locking device which may be readily inserted in any type of a float and held in place frictionally or by cement whereby a single locking device may be used in connection with a variety of different design floats. Furthermore, the device described herein includes a minimum of parts namely three which are a central plug or standard, as shown at 20, a ferrule 22 and a spring 24. The plug and ferrule are preferably formed from some suitable plastic such as polystyrene, methyl methacrylate (Lucite), cellulose acetate butyrate, etc. or they may be formed from aluminum or other light metal. The spring 24 is preferably made of stainless steel to prevent rusting.

Referring particularly to the drawings, Fig. 1 shows a float 26 of one design which includes my novel locking device 28 at the top thereof. Float 26 is made of any suitable material such as hollow plastic, wood, cork, or wood or cork coated with plastic etc. The locking device is shown in detail in one embodiment thereof in Fig. 2 wherein the ferrule 22 is in the form of an inverted cup. The plug 20 is provided with a pair of diametrically opposed lugs 32 each of which may be provided with a groove 34 through which a cord or fish line may be passed. The ferrule 22 includes a cooperating pair of notches 36 in the top wall thereof so that the ferrule is held in the position shown in Fig. 2, when the notches 36 are not in register with the lugs 32 and in non-telescoping relation. When the ferrule 22 is turned so that notches 36 register with the lugs 32 the ferrule will slip upwardly into telescoping relation as shown in Fig. 3 through the action of spring 24. In this position the line 50, which passes through the groove 34, is pinched between the plug 20 and the upper edge of the ferrule 22 and is held immovable with respect to the remainder of the device whereas in Fig. 2 the line has sufficient clearance in groove 34 to be freely slidable with respect thereto.

Fig. 4 shows the same device wherein the ferrule 22 has been pressed downwardly to permit insertion or removal of the line.

The main elongated portion 21 of the plug 20 may be secured to the fishing float 26 by merely pressing the same through an aperture, 51 in the collar 40. Preferably the collar 40 which comprises an upstanding rim, fits inside the ferrule 22 and acts as one seat for spring 24. This prevents entanglement of the line with the spring since no portion of the spring is ever exposed. It is obvious that any design of float 26 may be used with the plug 20 which may be inserted in a hole therein as preferably formed by a collar portion.

Any suitable organic solvent for the plastics used may be utilized to cause the materials of the plug and float to soften sufficiently to become bonded, or any suitable water proof cement may be applied to effect the same union. Solvents include toluene, xylene and acetone among others. It is apparent that this design is very simple and the line may be inserted, and the locking device, adjusted for the desired action, even in the dark, since there is no possibility of entanglement of the line with any part of the float and furthermore there is no small hole or the like through which the line must be threaded.

Fig. 6 shows another embodiment of the invention wherein instead of two grooves 34, a single groove 42 is provided, all other parts of the device being the same.

Fig. 7 shows still another embodiment wherein a cavity 44 is provided within the float and wherein a ferrule 46, which is substantially a washer, may be formed from aluminum or plastic material. The ferrule like washer 46 has similar notches 36 therein as shown in connection with the other ferrules and in fact the entire device operates in a manner similar to the other devices. Any of these expedients may be used without departing from the spirit of my invention which contemplates an inexpensive and easily assembled device consisting essentially of an upright plug which is immovable with respect to the float which plug includes a line holding means and a spring pressed locking ferrule which may be manipulated to any one of three positions to provide insertion or removal of the line, slip of the line with respect to the float and locking of the line with respect to the float.

In all embodiments the head portion 30 may be fully circular in transverse cross section.

While the embodiment of the present invention as herein disclosed, constitutes a preferred form, it is to be understood that other forms might be adopted, all coming within the scope of the claims which follow.

What is claimed is as follows:

1. A fishing float for use with a fishing line comprising, a floatable bulb, an elongated headed plug including a line receiving groove therein associated with said bulb, a slidable ferrule carried by said plug, spring means acting between said bulb and said ferrule and enclosed by said ferrule for urging said ferrule toward the head of said plug, and cooperative telescoping locking means carried by said plug and said ferrule capable upon selected rotation of the ferrule to locate the locking means in non-telescoping relation for holding the ferrule in a position wherein a line is slidable in said groove, said ferrule being capable of locking said line against movement relative to said plug when said locking means are in telescoping relation.

2. A fishing float for use with a fishing line comprising, a floatable bulb, an elongated headed plug including a line receiving groove therein, immovably associated with said bulb, an inverted cup shaped ferrule slidable on said plug, spring means entirely enclosed by said ferrule and disposed around the plug for urging the ferrule towards the head of the plug, and telescoping locking means carried conjointly by the plug and the ferrule and effective upon a predetermined rotation of the ferrule for holding the ferrule in a non-telescoping relation wherein a line is freely slidable in said groove, said ferrule being capable of locking said line against movement relative to said plug when said locking means are in telescoping relation.

3. A fishing float, comprising; a floatable bulb portion having an aperture therein, a locking device for fishing line associated with said float comprising an upright elongated plug secured to said bulb portion and partially inserted in said aperture, an annular collar associated with the plug and bulb and disposed around the plug, a head on said plug, a pair of opposed lugs of less dimension than said head and positioned on said plug beneath said head, each of said lugs having a notch therein adapted to receive a line, a ferrule disposed around the plug and slidable thereon and including a pair of opposed slots of complementary shape to said lugs whereby the ferrule slips past said lugs only when the slots are in register with said lugs, and spring means acting between said collar and the ferrule for urging the ferrule towards the head of said plug.

4. A fishing float comprising in combination, a floatable bulb, a locking device consisting of an upright substantially circular and elongated plug immovably secured to said bulb, a head on said plug comprising an enlarged portion spaced from said bulb, a lug on said plug beneath said head and extending radially from said plug and of less dimension than said head, a cup-shaped ferrule slidable and turnable on said plug and including a notch therein of a dimension slightly greater than said lug so that the ferrule can slide upwardly past the lug and into substantial contact with the head when the lug and notch are in register, said plug including a groove adjacent the lug and spaced from the head and adapted to receive a line, and spring means for urging said ferrule towards said head whereby the line is locked in said groove when the ferrule notch and lug are in register and is slidable in the groove when the ferrule notch and lug are not in register, said spring means being entirely covered and concealed by said ferrule.

5. A fishing float comprising in combination a floatable body, an upright, elongated plug secured to said body, an enlarged head on said plug remotely spaced from said body, a lug positioned on the plug and beneath the head and extending outwardly from said plug and of less dimension than said head, a ferrule positioned on said plug and slidable with respect thereto, said ferrule being substantially cup shaped and having a slot in the top wall thereof adapted to register with said lug when the ferrule is rotated properly whereby the ferrule can slide upwardly into substantial abutting contact with said head, said ferrule being prevented from abutting said head when the slot and lug are not in register, spring means disposed around the plug and acting between the ferrule and the body for urging the ferrule upwardly, said spring means being entirely covered and concealed by said ferrule, and means for receiving a line adjacent the head end of said plug, said means including a notch in which the line is pinched when the ferrule slot and lug are in register for preventing relative movement of the line and float and through which the line can slide when the ferrule slot and lug are not in register.

RALPH L. RHOTEHAMEL.

REFERENCES CITED

The following references are of record in the file of this patent:

UNITED STATES PATENTS

| Number | Name | Date |
| --- | --- | --- |
| 514,034 | Redfield | Feb. 5, 1894 |
| 2,279,769 | Von Bon Horst et al. | Apr. 14, 1942 |